(12) United States Patent
Dubinsky et al.

(10) Patent No.: US 7,626,886 B2
(45) Date of Patent: Dec. 1, 2009

(54) P-WAVE ANISOTROPY DETERMINATION USING BOREHOLE MEASUREMENTS

(75) Inventors: Vladimir Dubinsky, Houston, TX (US); Xiao Ming Tang, Sugar Land, TX (US); Yibing Zheng, Houston, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/447,746

(22) Filed: Jun. 6, 2006

(65) Prior Publication Data

US 2007/0280048 A1    Dec. 6, 2007

(51) Int. Cl.
*G01V 1/40* (2006.01)
*G01V 1/50* (2006.01)

(52) U.S. Cl. .................. 367/35; 367/25; 181/104

(58) Field of Classification Search ............. 181/104, 181/105; 367/35, 37
See application file for complete search history.

(56) References Cited

U.S. PATENT DOCUMENTS

| | | | | |
|---|---|---|---|---|
| 1,880,425 A | | 10/1932 | Flanders | |
| 2,244,484 A | | 6/1941 | Beers | |
| 2,732,906 A | | 1/1956 | Mayne | 181/0.5 |
| 3,217,828 A | | 11/1965 | Mendenhall et al. | 181/0.5 |
| 3,321,625 A | | 5/1967 | Wahl | 250/71.5 |
| 3,496,533 A | | 2/1970 | Semmelink | |
| 3,974,476 A | * | 8/1976 | Cowles | 367/87 |
| 4,184,562 A | * | 1/1980 | Bakamjian | 181/107 |
| 4,319,345 A | * | 3/1982 | Dennis | 367/25 |
| 4,382,290 A | * | 5/1983 | Havira | 367/35 |
| 4,495,606 A | * | 1/1985 | Smith | 367/86 |
| 4,509,149 A | * | 4/1985 | Ruehle | 367/27 |
| 4,524,433 A | * | 6/1985 | Broding | 367/25 |
| 4,685,091 A | * | 8/1987 | Chung et al. | 367/31 |
| 4,775,960 A | * | 10/1988 | Staron et al. | 367/31 |
| 4,797,861 A | | 1/1989 | Beasley | 367/50 |
| 4,943,950 A | | 7/1990 | Beasley et al. | 367/50 |
| 4,953,399 A | | 9/1990 | Fertl et al. | 73/152 |
| 4,964,103 A | | 10/1990 | Johnson | 367/53 |
| 5,452,761 A | | 9/1995 | Beard et al. | 166/250 |
| 5,530,679 A | | 6/1996 | Albertin | 367/68 |
| 5,544,127 A | * | 8/1996 | Winkler | 367/27 |
| 5,640,371 A | | 6/1997 | Schmidt et al. | |
| 5,677,893 A | | 10/1997 | de Hoop et al. | 367/50 |
| 5,758,539 A | | 6/1998 | Naville et al. | |

(Continued)

FOREIGN PATENT DOCUMENTS

WO    WO9859264    12/1998

OTHER PUBLICATIONS

H. Hou et al.; *An electro-acoustics impedance error criterion and its application to active noise control*, Applied Acoustics 65 (2004), pp. 485-499.

(Continued)

*Primary Examiner*—Ian J Lobo
(74) *Attorney, Agent, or Firm*—Madan & Sriram, P.C.

(57) ABSTRACT

A phased array of transducers is used to generate elastic waves into the earth formation in a selected direction. The impedance measured at the input to the transducer array is indicative of the elastic impedance of the earth formation in the selected direction.

21 Claims, 4 Drawing Sheets

U.S. PATENT DOCUMENTS

| | | | | |
|---|---|---|---|---|
| 5,852,588 | A | 12/1998 | de Hoop et al. | 367/38 |
| 6,002,642 | A | 12/1999 | Krebs | 367/73 |
| 6,247,542 | B1 | 6/2001 | Kruspe et al. | 175/40 |
| 6,470,275 | B1* | 10/2002 | Dubinsky | 702/9 |
| 6,864,890 | B2 | 3/2005 | Meek et al. | 345/440 |
| 6,909,666 | B2* | 6/2005 | Dubinsky et al. | 367/81 |
| 6,915,875 | B2* | 7/2005 | Dubinsky et al. | 181/102 |
| 6,920,082 | B2* | 7/2005 | Tang | 367/31 |
| 6,925,031 | B2* | 8/2005 | Kriegshauser et al. | 367/25 |
| 6,930,616 | B2* | 8/2005 | Tang et al. | 340/854.4 |
| 7,035,165 | B2* | 4/2006 | Tang | 367/28 |
| 7,055,388 | B2* | 6/2006 | Arndt et al. | 73/597 |
| 7,207,397 | B2* | 4/2007 | Miyamoto et al. | 175/50 |
| 2002/0113717 | A1* | 8/2002 | Tang et al. | 340/854.4 |
| 2003/0002388 | A1* | 1/2003 | Mandal | 367/25 |
| 2005/0036403 | A1* | 2/2005 | Leggett et al. | 367/32 |
| 2007/0183259 | A1* | 8/2007 | Yogeswaren et al. | 367/25 |

OTHER PUBLICATIONS

Hengchang Dai et al.; *Anisotropic migration and model building for 4C seismic data: A case study from Alba*, 2001 SEG 71st International Meeting, pp. 795-798.

Tariq Alkhalifah et al.; *Velocity analysis for transversely isotropic media*, Geophysics, vol. 60, No. 5 (Sep.-Oct. 1995), pp. 1550-1566, 21 Figs.

Philippe Berthet et al.; *Anisotropic Prestack Depth Migration: An Offshore Africa Case Study*, 2000 Society of Expliration Geophysicists, pp. 1-7, 6 Figs.

Samuel H. Gray et al.; *Kirchhoff migration using eikonal equation traveltimes*, Geophysics, vol. 59, No. 5 (May 1994), pp. 810-817, 7 Figs.

Arcangelo G. Sena et al.; *Kirchhoff migration and velocity analysis for converted and nonconverted waves in anisotropic media*, Geophysics, vol. 58, No. 2 (Feb. 1993), pp. 265-276, 11 Figs., 3 Tables.

Leon Thomsen; *Weak elastic anisotropy*, Geophysics, vol. 51, No. 10 (Oct. 1986), pp. 1954-1966, 5 Figs., 1 Table.

G.W. Postma; *Wave Propagation in a Stratified Medium*, Geophysics, vol. XX, No. 4 (Oct. 1955), pp. 780-806, 13 Figs.

Vladimir Grechka et al.; *Feasibility of nonhyperbolic moveout inversion in transversely isotropic media*, Geophysics, vol. 63, No . 3 (May-Jun. 1998), pp. 957-969, 9 Figs., 1 Table.

Results of Search of "Geophysics" on Oct. 5, 2008.

* cited by examiner

P-WAVE ANISOTROPY DETERMINATION USING BOREHOLE MEASUREMENTS

FIELD OF THE INVENTION

The present invention is a method of obtaining an anisotropic velocity model for proper depth imaging of seismic data.

BACKGROUND OF THE ART

The search for subsurface hydrocarbon deposits typically involves a multifaceted sequence of data acquisition, analysis, and interpretation procedures. The data acquisition phase involves use of an energy source to generate signals that propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy that vary as a function of time, receiver position, and source position and, most importantly, vary as a function of the physical properties of the structures from which the signals reflect. The data analyst uses these traces along with a geophysical model to develop an image of the subsurface geologic structures.

Common Mid Point (CMP) stacking, also sometimes referred to as Common Depth Point or Common Reflection Point (CDP or CRP, respectively), of seismic field data is well known. See, for example, U.S. Pat. No. 3,217,828 to Mendenhall et al., and U.S. Pat. No. 2,732,906 to Mayne, which are incorporated herein by reference as a teaching of the CMP technique. In the CMP technique, redundant data are acquired over the same portion of the subsurface using a plurality of source-receiver offsets. Using what is called the Normal Moveout (NMO) velocity, the redundant seismic traces are stacked to give traces with an improved signal-to-noise ratio.

A comparable procedure is used in seismic imaging in areas with complex structure. Again, a redundant data set is combined using a so-called migration velocity to position seismic events in the proper spatial position.

Implicit in the CMP and the migration process is an assumption that the seismic velocity is isotropic. This assumption was conveniently overlooked for years as the effects were relatively minor, and, given the quality of seismic data available, it was difficult to process the data using an anisotropic velocity model. It is only within the last few years that there has been a sustained effort to account for the effects of anisotropy.

P-wave anisotropy, i.e., a change in the compressional wave velocity with direction of propagation in earth formations due to combined effects of sedimentary layering and the intrinsic anisotropy of the rock. Shales, in particular, could exhibit more than a 20% difference in P-wave velocities parallel to bedding and P-wave velocities perpendicular to bedding. Sandstones and limestones usually show smaller differences in velocity with direction of propagation. Postma (1955) showed that a type of anisotropy called transverse isotropy could be exhibited by seismic waves propagating through a thin layering of isotropic materials.

Determination of anisotropic velocities from surface seismic data is difficult due to the relatively poor data quality and the relatively low frequencies of surface seismic data. Nevertheless, there is prior art on the determination of an anisotropic velocity model for depth imaging of seismic data. See, for example, U.S. Pat. No. 6,864,890 to Meek et al.

Wireline Measurements made in a borehole are generally of higher quality (higher signal-to-noise ratio, commonly called SNR) than surface seismic data. Independent evaluation of the P-Wave velocity components—vertical and horizontal—in an anisotropic formation by conducting conventional wireline logging measurements is not a trivial task. For a vertical borehole (with an axis perpendicular to bedding), the traditional acoustic logging based on analysis of the head wave gives the vertical P-wave velocity component. For a horizontal borehole (with an axis parallel to bedding), the traditional acoustic logging would give the horizontal P-wave velocity component. For an arbitrary borehole inclination, the traditional acoustic logging gives a P-wave velocity that depends upon both the horizontal P-wave velocity component and the vertical P-wave velocity component.

It would be desirable to have a method of determination of seismic velocities as a function of angle of propagation in an earth formation using high quality borehole measurements. The present invention satisfies this need.

SUMMARY OF THE INVENTION

One embodiment of the invention is a method of determining a parameter of interest of an earth formation. A logging tool is conveyed into a borehole in the earth formation. An elastic wave is generated into the earth formation at an angle inclined to a longitudinal axis of the borehole by activating at least one transducer. The parameter of interest is estimated using a voltage and a current in the at least one transducer. The angle may be about 90°. A plurality of transducers with a predefined delay may be used to generate the elastic wave. The elastic wave may be a compressional wave and/or a shear wave. A density measurement may be made and used for estimating the parameter of interest. The parameter of interest may be an element of an elastic stress tensor, a compressional wave velocity, a shear wave velocity, a compressional wave impedance and/or a shear wave impedance. Estimating the parameter of interest may further use measurement of a phase shift between the current and the voltage. A calibration measurement may be made. The parameter of interest may further be used for migrating surface seismic data and/or offset VSP data.

Another embodiment of the invention is an apparatus for determining a parameter of interest of an earth formation. The apparatus includes a logging tool conveyed into a borehole in the formation. At least one transducer on the logging tool generates an elastic wave into the earth formation at an angle inclined to a longitudinal axis of the borehole. A processor determines an impedance of the at least one transducer using a voltage and a current measurement. The processor may further determine a parameter of interest of the earth formation. A plurality of transducers may be used, with the processor sequentially activating the transducers with a predefined delay. The apparatus may generate a compressional wave and/or a shear wave. The apparatus may further include a device which measures the formation density, and the processor may further use the density for estimating the parameter of interest. The parameter of interest may be an element of an elastic stress tensor, a compressional wave velocity, a shear wave velocity, a compressional wave impedance and/or a shear wave impedance. The processor may further use a phase shift between the current and the voltage for estimating the parameter of interest. The parameter of interest may include an anisotropic velocity model of the earth formation. The apparatus may further include a device which makes a measurement of an elastic wave velocity in a direction substantially parallel to the axis of the borehole. The logging tool may be conveyed into the borehole using a wireline or a drilling tubular.

Another embodiment of the invention is a computer readable medium for use with an apparatus for estimating a parameter of interest of an earth formation. The apparatus includes a logging tool conveyed into a borehole in the earth formation. At least one transducer on the logging tool generates an elastic wave into the earth formation at an angle inclined to an axis of the borehole. The medium includes instructions which enable a processor to estimate an impedance of the transducer using a voltage and a current of the transducer. The medium may include a ROM, an EPROM, an EEPROM, a flash memory, and/or an optical disk.

BRIEF DESCRIPTION OF THE DRAWINGS

For detailed understanding of the present invention, reference should be made to the following detailed description of the preferred embodiment, taken in conjunction with the accompanying drawing and in which.

DETAILED DESCRIPTION OF THE INVENTION

The present invention is discussed with reference to specific logging instruments that may form part of a string of several logging instruments for conducting wireline logging operations. It is to be understood that the choice of the specific instruments discussed herein is not to be construed as a limitation and that the method of the present invention may also be used with other logging instruments as well.

Figure 1:
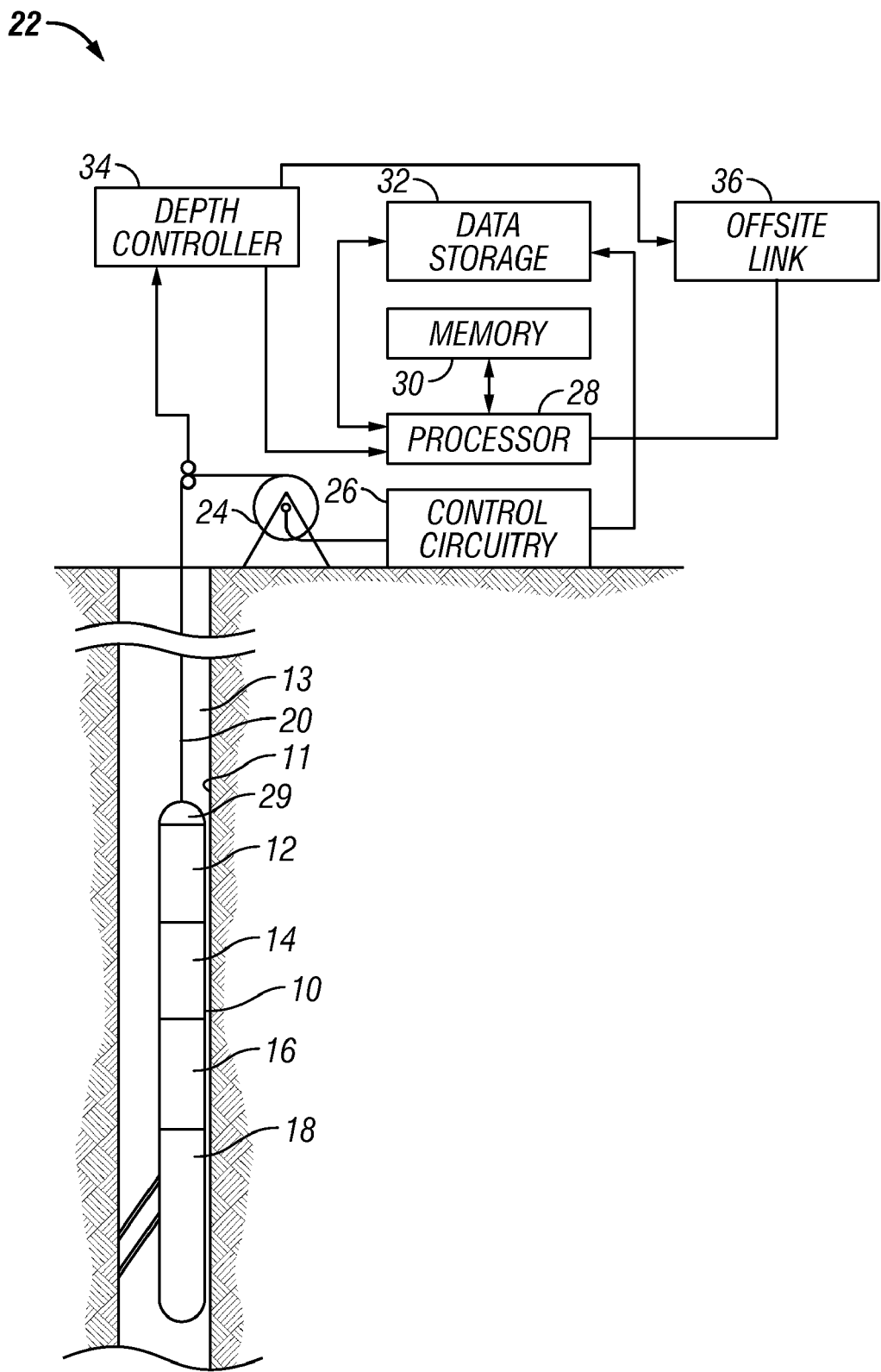
FIG. 1 is a schematic illustration of a wireline logging system.

A typical configuration of the logging system is shown in FIG. 1. This is a modification of an arrangement from U.S. Pat. No. 4,953,399 to Fertl et al., having the same assignee as the present invention, the contents of which are incorporated herein by reference. Shown in FIG. 1 is a suite of logging instruments 10, disposed within a borehole 11 penetrating an earth formation 13, illustrated in vertical section, and coupled to equipment at the earth's surface, in accordance with various illustrative embodiments of the method and apparatus of the present invention. Logging instrument suite 10 may include a resistivity device 12, a natural gamma ray device 14, and/or two porosity-determining devices, such as a neutron device 16 and/or a density device 18. Collectively, these devices and others used in the borehole for logging operations are referred to as formation evaluation sensors. The resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present invention, the contents of which are fully incorporated herein by reference, may be used. The natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 16 may be one of several types known to the art for using the response characteristics of the formation to neutron radiation to determine formation porosity. Such a device is essentially responsive to the neutron-moderating properties of the formation. The density device 18 may be a conventional gamma-gamma density instrument such as that described in U.S. Pat. No. 3,321,625 to Wahl, used to determine the bulk density of the formation. A downhole processor 29 may be provided at a suitable location as part of the instrument suite.

The logging instrument suite 10 is conveyed within borehole 11 by a cable 20 containing electrical conductors (not illustrated) for communicating electrical signals between the logging instrument suite 10 and the surface electronics, indicated generally at 22, located at the earth's surface. The logging devices 12, 14, 16, and/or 18 within the logging instrument suite 10 are cooperatively coupled such that electrical signals may be communicated between each of the logging devices 12, 14, 16, and/or 18 and the surface electronics 22. The cable 20 is attached to a drum 24 at the earth's surface in a manner familiar to the art. The logging instrument suite 10 is caused to traverse the borehole 11 by spooling the cable 20 on to or off of the drum 24, also in a manner familiar to the art.

The surface electronics 22 may include such electronic circuitry as is necessary to operate the logging devices 12, 14, 16, and/or 18 within the logging instrument suite 10 and to process the data therefrom. Some of the processing may be done downhole. In particular, the processing needed for making decisions on speeding up (discussed below) or slowing down the logging speed is preferably done downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision-making is carried out. However, with present data rates available on wirelines, the decision-making is preferably done downhole.

Control circuitry 26 contains such power supplies as are required for operation of the chosen embodiments of logging devices 12, 14, 16, and/or 18 within the logging instrument suite 10 and further contains such electronic circuitry as is necessary to process and normalize the signals from such logging devices 12, 14, 16, and/or 18 in a conventional manner to yield generally continuous records, or logs, of data pertaining to the formations surrounding the borehole 11. These logs may then be electronically stored in a data storage 32 prior to further processing. A surface processor 28 may process the measurements made by the formation evaluation sensor(s) 12, 14, 16, and/or 18. This processing could also be done by the downhole processor 29.

The surface electronics 22 may also include such equipment as will facilitate machine implementation of various illustrative embodiments of the method of the present invention. The surface processor 28 may be of various forms, but preferably is an appropriate digital computer programmed to process data from the logging devices 12, 14, 16, and/or 18. A memory unit 30 and the data storage unit 32 are each of a type to interface cooperatively with the surface processor 28 and/or the control circuitry 26. A depth controller 34 determines the longitudinal movement of the logging instrument suite 10 within the borehole 11 and communicates a signal representative of such movement to the surface processor 28. The logging speed is altered in accordance with speedup or slowdown signals that may be communicated from the downhole processor 29, and/or provided by the surface processor 28, as discussed below. This is done by altering the rotation speed of the drum 24. Offsite communication may be provided, for example, by a satellite link, by a telemetry unit 36.

Figure 2:
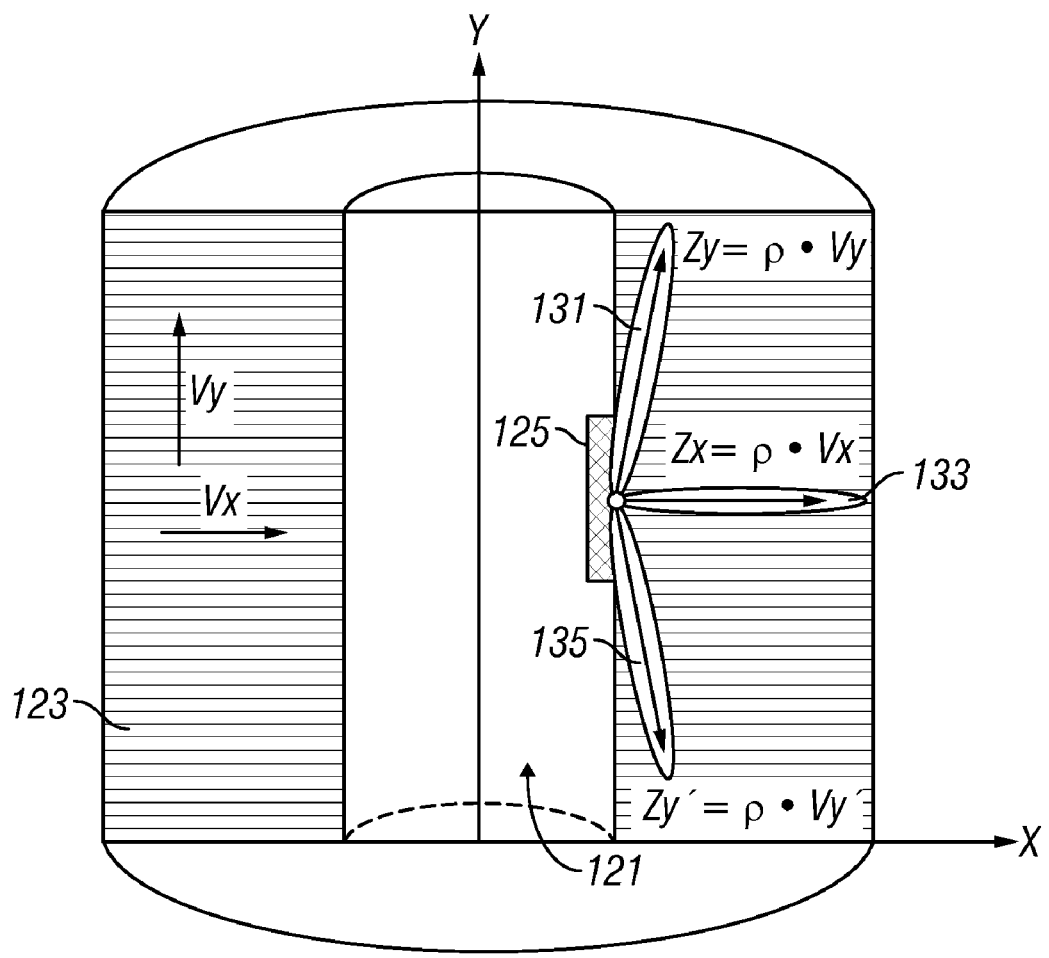
FIG. 2 illustrates the principle of the present invention of using a phased array to determine impedance.

Referring now to FIG. 2, a logging tool 10 specific to various illustrative embodiments of the present invention is illustrated. The borehole 11 in an earth formation 123 is depicted by a borehole 121. Positioned within the borehole 121 and in contact with a wall of the borehole 121 is an array 125 of transducers. Each of the transducers of the array 125 may be a piezoelectric transducer of the type commonly used for making acoustic measurements in boreholes. A commonly used transducer is a bender bar that includes a disk and a piezoelectric material that flexes the disk in a bender action. The disk is fixed around its edge, as by a support ring, so that when a voltage is applied to the piezoelectric material, the center portion of the disk flexes. Alternatives to piezoelectric transducers include magnetostrictive, electromagnetic, and/or electromechanical transducers. The array 125 of transducers is part of one of the logging devices 12, 14, 16, and/or 18 that forms the logging instrument string. A feature of the present invention is electronic circuitry that sequentially activates the transducers of the array 125 to generate an elastic wave in a selected direction in the earth formation. Three such directions are shown in FIG. 2 by the beams 131, 133, and 135. In an anisotropic medium, each of these beams 131, 133, and 135 will have a different velocity of propagation. Recognizing that elastic impedance is the product of density and velocity, the problem of velocity determination is equivalent to the problem of determination of the elastic impedance of respective elastic waves traveling in different directions.

Figure 3A:
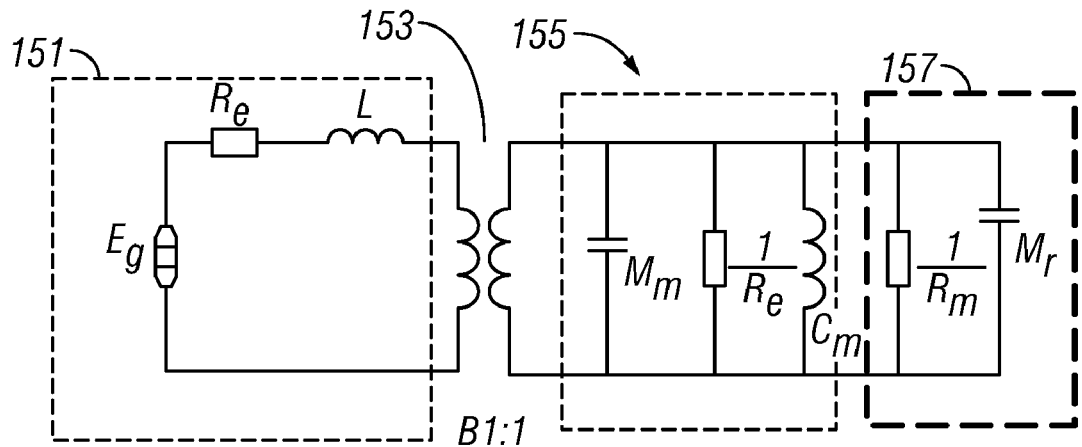
FIGS. 3a and 3b show equivalent electrical circuit representing an electromagnetic transducer coupled to an earth formation.

We first address the basic problem of determination of the elastic impedance as seen by a single transducer of the array 125. FIG. 3a is a schematic electrical-mechanical-acoustical analogy circuit representation of an electromagnetic transducer, as in Hou and Yang (2004), for example. The transformer 153 represents the coupling between a primary side 151 that includes a power source $E_g(\omega t)=Re[|E_g(\omega t)|\exp(j\omega t)]$, at an angular frequency $\omega=2\pi f$, which has an internal resistance $R_e$ and an inductive reactance $X_{Le}=j\omega L$. A secondary side 155 represents the mass that is in contact with the borehole 121 wall and produces motion of the formation 123. The secondary side 155 portion of the transducer of the array 125 is represented by the parallel RLC circuit 155 that has a resonant frequency $f_m$ given by $$\omega_m = 2\pi f_m = \frac{1}{\sqrt{C_m M_m}}.$$

The formation 123 is represented by circuitry 157. The parallel RC circuitry 157 has an impedance $Z_r$ given by $$\frac{1}{Z_r} = \frac{1}{1/R_r} + \frac{1}{1/(j\omega M_r)} = R_r + j\omega M_r.$$

Figure 3B:
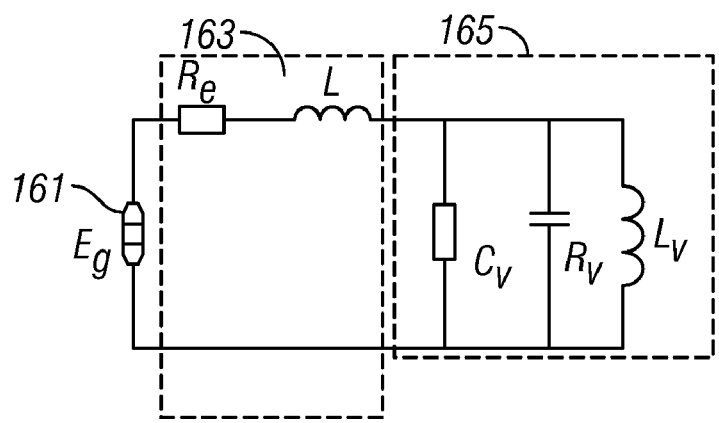

A simplified electrical equivalent circuit is shown in FIG. 3b, where the transformer coupling is eliminated. The circuit of FIG. 3b is a reasonable representation of a piezoelectric transducer of the array 125 coupled to the earth formation 123. The transducer of the array 125 includes the RL circuit 163 that has an impedance $Z_e$ given by $Z_e=R_e+X_{Le}=R_e+j\omega L$. The power source $E_g(\omega t)=Re[|E_g(\omega t)|\exp(j\omega t)]$ is denoted by 161, while the interaction of the transducer of the array 125 with the formation 123 is represented by a parallel RLC load circuit 165. Given this electrical equivalent circuit, by exciting the transducer of the array 125 at a plurality of angular frequencies $\omega_i=\omega_1, \omega_2, \omega_3, \ldots$, and measuring the plurality of phase shifts $\phi_i=\phi_1, \phi_2, \phi_3, \ldots$, between the applied voltages $E_g(\omega_i t)=Re[|E_g(\omega_i t)|\exp(j\omega t)]$ and the respective currents $i_e([\omega_i+\phi_i]t)=Re[|i_e([\omega_i+\phi_i]t)|\exp(j[\omega_i+\phi_i]t)]$ in the RL circuit 162 portion of the transducer of the array 125, it is possible to completely characterize the equivalent impedance $$Z_v = \frac{1}{1/R_v + j\omega C_v + 1/(j\omega L_v)}$$

of the parallel RLC load circuit 165, giving the interaction of the transducer of the array 125 with the formation 123.

The total impedance $Z=Z_e+Z_v=R_e+j\omega L+Z_v$ of the electrical equivalent circuit represented by FIG. 3b is $$Z = R_e + j\omega L + \frac{1}{1/R_v + j\omega C_v + 1/j\omega L_v}, \quad (1)$$

where $$R_v = \frac{B1^2}{R_m + R_r}, \quad L_v = B1^2 C_m \quad (2)$$

$$C_v = \frac{(M_m + M_r)}{B1^2},$$

where:

B1 represents a factor defining the efficiency of the mechanical-to-electrical conversion;

$M_m$, $R_m$, and $C_m$ define the mechanical-equivalent impedance of the vibrating secondary side 155 portion of the transducer of the array 125; and $R_r$ and $M_r$ define the impedance $$Z_r = \frac{1}{R_r + j\omega M_r}$$

of the formation 123 represented by the parallel RC circuitry 157.

By making a calibration measurement with the transducer of the array 125 in contact with a material of known elastic velocity and density, the determined impedance $Z_v$ of the parallel RLC load circuit 165 can be easily converted to a real world impedance that is the product of velocity and density. When calibration data are available, the impedance of the earth can thus be determined from the current in and the voltage of the transducer of the array 125. The principles discussed above can also be used with the phased array 125 of the type shown in FIG. 2. By sequentially activating the individual transducers of the array 125 with a predetermined time delay between the individual transducer elements, a beam can be directed in any direction in the subsurface and the impedance for that particular direction measured. A phase determination may be made using weighted averages of the voltages of the individual transducers that constitute the array 125 and currents in the individual transducers that constitute the array 125. Density measurements made with a suitable density logging tool can then be used to estimate the velocity in the direction in which the impedance is measured.

For the case of transverse isotropy (TI), the TI medium is characterized by five elastic moduli. These may be denoted by the tensor $$\begin{bmatrix} C_{11} & C_{11}-2C_{66} & C_{13} & 0 & 0 & 0 \\ C_{11}-2C_{66} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix}, \quad (3)$$

where the modulus $C_{11}$ defines the velocity of a horizontally propagating P-wave, $C_{33}$ defines the velocity of a vertically propagating P-wave, $C_{44}$ defines the velocity of a vertically propagating shear wave, and $C_{66}$ defines the velocity of a horizontally propagating S-wave (shear wave) with horizontal polarization. These four parameters are determinable by making suitable measurements of P- and S-waves parallel to and perpendicular to the symmetry axis. The elements of the matrix of Eqn. (3) may be referred to as elements of an elastic stress tensor.

Daley and Hron showed that the compressional velocity for plane waves propagating at an angle θ to the symmetry axis is given by $$2\rho V_p^2 = C_{33} + C_{44} + (C_{11} - C_{33})\sin^2\theta + D(\theta), \text{ where} \quad (4)$$

$$D(\theta) = \quad (5)$$
$$\{(C_{33}-C_{44})^2 + 2[2(C_{13}+C_{44})^2 - (C_{33}-C_{44})(C_{11}+C_{33}-2C_{44})] \\ \sin^2\theta + [(C_{11}+C_{33}-2C_{44})^2 - 4(C_{13}+C_{44})^2]\sin^4\theta\}.$$

This is a function of only $C_{11}$, $C_{33}$, $C_{44}$ and $C_{13}$, so that knowledge of these four parameters is sufficient to be able to perform migration and imaging of compressional wave data.

For various illustrative embodiments of the present invention, $C_{11}$ can be obtained by measuring the impedance to compressional waves radiating out in a plane perpendicular to the borehole 121 (as shown at 133 in FIG. 2). This direction is, of course, inclined to the longitudinal axis of the borehole 121. $C_{33}$ can be obtained by measuring the impedance of a compressional wave propagating parallel to the borehole 121. However, it is much easier to get the compressional wave velocity for a compressional wave parallel to the borehole 121 using a conventional sonic log. The parameter $C_{44}$ can be obtained using a dipole shear-logging tool. In each case, the elastic modulus $C_{ij}$ is given by the square of the velocity multiplied by density.

Figure 4:
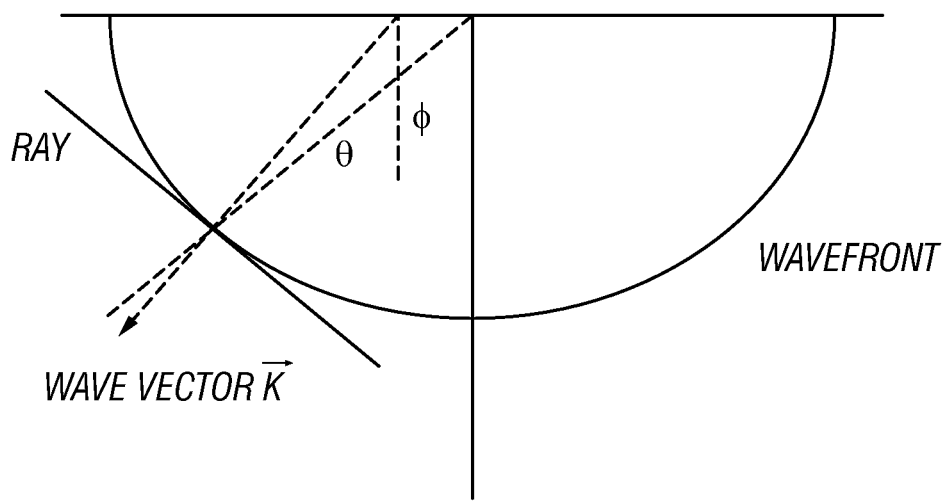
FIG. 4 illustrates a P-wave wavefront in a transversely isotropic medium.

It should be noted that in an anisotropic medium, it may be important to differentiate between the phase angle θ and the ray angle φ. This is illustrated in FIG. 4. The wavefront is locally perpendicular to the propagation vector. The ray direction is given by the relation:

$$\tan\phi = \frac{\tan\theta + \frac{dv}{d\theta}\cos\theta}{1 - \frac{\tan\theta}{v}\frac{dv}{d\theta}}, \quad (6)$$

where v is given by Eqns. (4)-(5) for a compressional wave.

Thomsen defined the parameters δ and ε as $$\delta = \frac{(C_{13}+C_{44})^2 - (C_{33}-C_{44})^2}{2C_{33}(C_{33}-C_{44})}, \quad (7)$$

$$\varepsilon = \frac{C_{66}-C_{44}}{2C_{44}},$$

and showed that when δ=ε, the P-wave wavefront is an ellipse. This is defined as elliptical anisotropy, and requires only the determination of the compressional wave velocity parallel to and perpendicular to the borehole 121 to characterize the wavefront. However, if the TI is non-elliptical, then characterization of the wavefront requires determination of $C_{13}$. The parameter $C_{13}$ is not determinable by measurements parallel to and perpendicular to the symmetry axis. Thus, for the purpose of being able to characterize the compressional wave velocity for the non-elliptical case, it is necessary and sufficient to make a single additional measurement in a direction that is, for example, between 131 and 133 or between 133 and 135 in FIG. 2. Additional measurements may be made to provide redundancy to the measurements.

For the purposes of the present invention, we ignore the difference between the ray direction and the wavefront direction given by Eqn. (7). This assumption is usually justified for weak anisotropy (which we define as $|\delta| \leqq 0.2$, $|\epsilon| \leqq 0.2$). Under these conditions, the impedance measurement made using the method discussed above will correspond to the ray direction of the compressional wavefront, the parameter that is needed for imaging applications.

Those skilled in the art and having the benefit of the present disclosure would recognize that a stress source on the wall of a borehole produces, in addition to compressional waves in the earth formation, shear waves in directions away from a radial direction. See Lee (1982). To a certain extent, it is impossible to generate one without the other. The result of this may be that in directions other than a radial direction, the measured impedance may be a combination of compressional and shear wave impedances. The effect of the shear impedance is, of course, zero in the radial direction, and can be minimized by making the additional measurements needed for determination of $C_{13}$ for non-elliptical anisotropy as close to the radial direction as possible. The shear wave and the compressional wave that may be generated in the earth formation by the logging tool are commonly referred to as elastic waves. The parameter that may be determined using the method of the present invention may include an element of an elastic stress tensor, a compressional wave velocity, a shear wave velocity, a compressional wave impedance and a shear wave impedance. All of these characterize the propagation of elastic waves in an earth formation.

Figure 5:
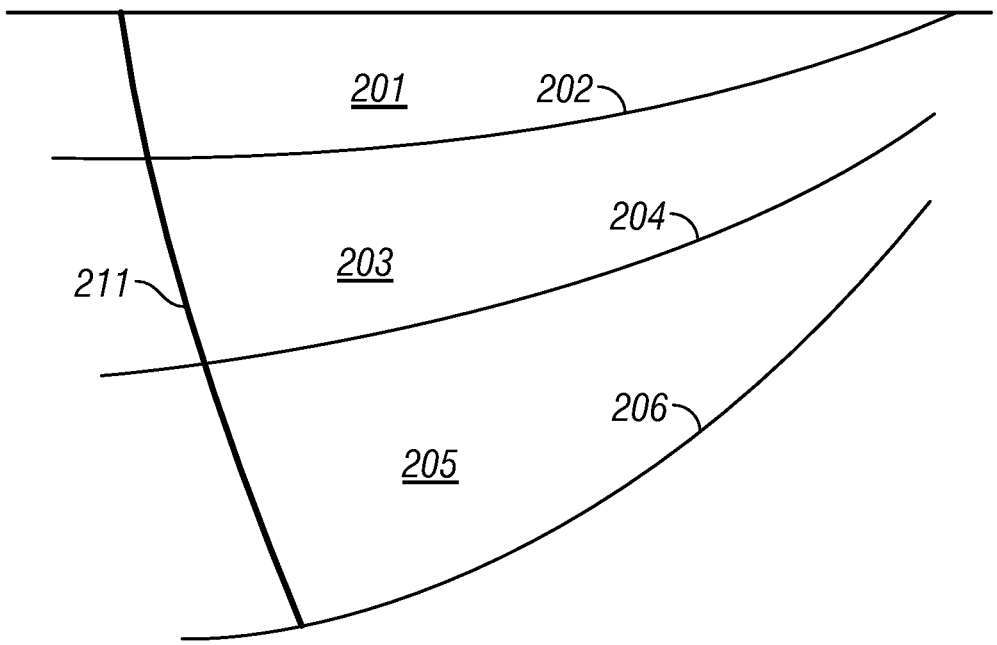
FIG. 5 illustrates a wellbore in a region of the earth with bed boundaries defining respective regions in the subsurface.

Measurements made using the method described above may be made at numerous depths in a borehole. The result is a log of the relevant quantities needed to define an aniosotropic velocity model of the earth formation that is used for migration of surface seismic data or of offset data acquired in vertical seismic profiling. For elliptical anisotropy, the velocity model includes a vertical velocity and a horizontal velocity for each of a plurality of regions in the subsurface. This is schematically illustrated in FIG. 5 where a wellbore 211 is shown in a region of the earth with bed boundaries 202, 204, and 206 that define respective regions 201, 203, and 205. Measurements made using the method described above can be used to define a velocity model for each of the regions 201, 203, and 205. The velocity model may then be used for migration of seismic data acquired over the region so as to properly image the bed boundaries 202, 204, and 206. See, for example U.S. Pat. No. 5,530,679 to Albertin, U.S. Pat. No. 4,943,950 to Beasley et al., and U.S. Pat. No. 6,864,890 to Meek et al.

The present invention has been described above in terms of a wireline implementation. The method of the present invention may also be used in a measurement-while-drilling (MWD) implementation. For example, the transducer array may be on a non-rotating sleeve that is part of a bottomhole assembly conveyed downhole on a drilling tubular. Such a non-rotating sleeve is described in U.S. Pat. No. 6,247,542 of Kruspe et al, having the same assignee as the present invention, the contents of which are incorporated herein by reference.

The processing of the measurements made in wireline applications may be done by the surface processor 28, by the downhole processor 29, or at a remote location. The data acquisition may be controlled at least in part by the downhole electronics. Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

While the foregoing disclosure is directed to specific embodiments of the present invention, various modifications will be apparent to those skilled in the art. It is intended that all variations within the scope of the appended claims be embraced by the foregoing disclosure.

What is claimed is:

1. A method of estimating a value of an impedance of a transversely isotropic earth formation, the method comprising:
   conveying a logging tool into a borehole in the earth formation;
   activating at least one transducer on the logging tool in contact with a wall of the borehole for generating an elastic wave into the earth formation at a selected angle inclined to a longitudinal axis of the borehole;
   estimating the value of the impedance of the transversely isotropic earth formation at the selected angle using a voltage of the at least one transducer and a current in the at least transducer; and
   recording the estimated value of the impedance of the transversely isotropic earth formation at the selected angle on a suitable medium.

2. The method of claim 1 wherein the at least one transducer comprises a plurality of transducers, and wherein generating the elastic wave at the selected angle further comprises sequentially activating each of the plurality of transducers with a predefined delay.

3. The method of claim 1 wherein the elastic wave is selected from the group consisting of (i) a compressional wave, and (ii) a shear wave.

4. The method of claim 1 further comprising estimating a velocity of the earth formation at the selected angle by using a measurement of a density of the earth formation.

5. The method of claim 1 wherein estimating the value of the impedance at the selected angle further comprises measuring a phase shift between the current and the voltage.

6. The method of claim 1 wherein estimating the value of the impedance at the selected angle further comprises making a calibration measurement.

7. The method of claim 1 further comprising using the estimated value of the impedance to provide an anisotropic velocity model of the earth formation, and using the anisotropic velocity model for at least one of (i) migrating surface seismic data, and (ii) migrating offset vertical seismic profiling data.

8. The method of claim 1 further comprising making a measurement of an elastic wave velocity in a direction substantially parallel to the axis of the borehole.

9. The method of claim 1 wherein the estimated impedance comprises a compressional wave impedance.

10. An apparatus for determining a value of an impedance of a transversely isotropic earth formation, the apparatus comprising:
    a logging tool configured to be conveyed into a borehole;
    at least one transducer on the logging tool in contact with a wall of the borehole configured to generate an elastic wave into the earth formation at a selected angle inclined to a longitudinal axis of the borehole; and
    a processor configured to:
    (A) estimate an impedance of the transversely isotropic earth formation at the selected angle using a voltage of the at least one transducer and a current in the at least one transducer; and
    (B) record the estimated impedance of the transversely isotropic earth formation at the selected angle on a suitable medium.

11. The apparatus of claim 10 wherein the at least one transducer comprises a plurality of transducers, and wherein the processor is configured to sequentially activate each of the plurality of transducers with a predefined delay to generate the elastic wave into the formation at the selected angle.

12. The apparatus of claim 10 wherein the elastic wave is selected from the group consisting of (i) a compressional wave, and (ii) a shear wave.

13. The apparatus of claim 10 further comprising a device configured to measure a density of the formation and wherein the processor is further configured to estimate a velocity of the transversely isotropic earth formation at the selected angle by using the density and the estimated impedance.

14. The apparatus of claim 10 wherein the processor is configured to estimate the value of the impedance of the transversely isotropic earth formation at the selected angle by further using a phase shift between the current and the voltage.

15. The apparatus of claim 10 wherein the processor is configured to estimate the value of the impedance of the transversely isotropic earth formation at the selected angle by further using a calibration measurement.

16. The apparatus of claim 10 further comprising estimating an anisotropic velocity model of the earth formation.

17. The apparatus of claim 10 further comprising a device configured to make a measurement of an elastic wave velocity in a direction substantially parallel to the axis of the borehole.

18. The apparatus of claim 10 further comprising a conveyance device configured to convey the logging tool into the borehole, the conveyance device selected from (i) a wireline, and (ii) a drilling tubular.

19. The apparatus of claim 10 wherein the estimated impedance comprises a compressional wave impedance.

20. A computer-readable medium accessible to a processor, the computer-readable medium comprising instructions which enable the processor to:
- use an output of at least one transducer on a logging tool in contact with a wall of a borehole configured to generate an elastic wave at a selected angle into a transversely isotropic earth formation;
- estimate an impedance of the transversely isotropic earth formation at the selected angle using a voltage of the at least one transducer and a current in the at least one transducer; and
- record the estimated value of the impedance of the transversely isotropic earth formation at the selected angle on a suitable medium.

21. The computer-readable medium of claim 20 further comprising at least one of (i) a ROM, (ii) an EPROM, (iii) an EEPROM, (iv) a flash memory, and (v) an optical disk.

* * * * *